United States Patent
Barghi

(10) Patent No.: US 9,813,267 B1
(45) Date of Patent: Nov. 7, 2017

(54) COMMUNICATON UNIT, CIRCUIT FOR QUADRATURE SAMPLING ERROR ESTIMATION AND COMPENSATION AND METHOD THEREFOR

(71) Applicant: FREESCALE SEMICONDUCTOR, INC., Austin, TX (US)

(72) Inventor: Frederic Georges-Ferdinand Barghi, Le Rouret (FR)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/342,198

(22) Filed: Nov. 3, 2016

(30) Foreign Application Priority Data

May 27, 2016 (EP) .................................. 16305619

(51) Int. Cl.
| | |
|---|---|
| H04B 1/38 | (2015.01) |
| H04L 5/16 | (2006.01) |
| H04L 27/00 | (2006.01) |
| H04L 27/26 | (2006.01) |
| H04B 17/336 | (2015.01) |
| H04L 25/02 | (2006.01) |
| H04L 7/00 | (2006.01) |

(52) U.S. Cl.
CPC ....... H04L 27/0002 (2013.01); H04B 17/336 (2015.01); H04L 7/0025 (2013.01); H04L 7/0041 (2013.01); H04L 25/0204 (2013.01); H04L 27/2626 (2013.01)

(58) Field of Classification Search
CPC ............. H04L 27/0002; H04L 27/2626; H04L 25/0204; H04L 7/0025; H04L 7/0041; H04B 17/336; H04B 1/0475; H03C 3/406; H03M 3/382

USPC .......................................... 375/221, 222, 235
See application file for complete search history.

(56) References Cited

U.S. PATENT DOCUMENTS

| | | | |
|---|---|---|---|
| 7,856,065 B2 | 12/2010 | Jonsson | |
| 8,331,479 B2 | 12/2012 | Zhao | |
| 8,416,889 B2 | 4/2013 | Dell'Amico et al. | |
| 8,687,684 B1 * | 4/2014 | Huynh | H03M 3/382 375/224 |
| 2009/0161778 A1 * | 6/2009 | Okada | H03C 3/406 375/260 |
| 2012/0294343 A1 * | 11/2012 | Teetzel | H04B 1/0475 375/224 |
| 2012/0328041 A1 | 12/2012 | Chen et al. | |

FOREIGN PATENT DOCUMENTS

EP 1139624 A2 10/2001

* cited by examiner

*Primary Examiner* — Phuong Phu

(57) ABSTRACT

A communication unit comprises a modem configured to generate a first and second test digital quadrature signal. The modem is configured to: estimate a first sampling error performance associated with a first quadrature path from the first received test digital quadrature signal; estimate a second sampling error performance associated with a second quadrature path from the second received test digital quadrature signal; and generate at least one sampling error compensation signal based on the first estimated sampling error performance and second estimated sampling error performance to be applied to at least one of the receiver and transmitter.

20 Claims, 4 Drawing Sheets

COMMUNICATON UNIT, CIRCUIT FOR QUADRATURE SAMPLING ERROR ESTIMATION AND COMPENSATION AND METHOD THEREFOR

FIELD

The field of the invention relates to a communication unit, circuit and a method for digital quadrature (IQ) sampling error estimation and compensation. The invention is applicable to, but not limited to, IQ sampling error estimation and compensation associated with analogue to digital conversion in a receiver and digital to analogue conversion in a transmitter, for example using orthogonal frequency division multiplex (OFDM) signals.

BACKGROUND

A typical wireless communication receiver includes a downconverter stage to translate a received radio frequency carrier signal to an intermediate frequency (IF) signal and thereafter (or direct) to a baseband signal. Many current wireless communication systems employ digital technology, which introduces complexity into the receiver's downconverter stage, whereby an input radio frequency signal is divided and multiplied by a local oscillator signal and a quadrature version of the local oscillator signal. The resulting outputs are known as the in-phase (I) and quadrature (Q) components. Filtering and amplification in the analogue stages typically precede analogue to digital conversion and subsequent filtering and amplification in the digital domain.

Imperfections within the analog components of the downconverter stage, or component differences between respective quadrature paths of the downconverter stage, can result in imbalances between the two branches, with respect to the relative amplitudes, relative phases, or both. These are known as IQ imbalances, and can have significant impact on the performance of a wireless receiver. Notably, the impact becomes more acute as higher-order modulation schemes or higher IQ bandwidth is employed. This is particularly true in the direct-conversion zero-IF receivers that are contemplated for many future orthogonal frequency division multiplex (OFDM) applications. Similar IQ imbalances can occur in the transmitter.

Most radio architectures that use digital modulation schemes require two digital to analog converters (DACs) in the transmit path to convert respective quadrature (I and Q) signals, and two analog to digital converters (ADCs) in the receive path to convert respective quadrature (I and Q) signals. An imbalance may occur between the 'I' and 'Q' paths. Another source of imbalance results from a residual delay error existing between clock edges used in each corresponding component or circuit (i.e. the ADC 'I' and the ADC 'Q' or the DAC 'I' and the DAC 'Q'). This residual delay error is dependent on the circuit layout and silicon process used and leads to a resultant sampling error between the circuits and components.

An additional recent development in wireless communications has introduced further short or intermediate range wireless capabilities to wireless communication units, e.g. WiFi™. One problem resulting from the introduction of WiFi™ to current wireless communication units (as reported in 802.11n/ac/ad/ah standards) is the requirement to support improved signal-to-noise ratios (SNRs), over an increased bandwidth, which exacerbates the need to maintain tight control of IQ imbalances. The inventor of the present invention has also recognised that subcarriers on the edges of the spectrum employed by such wireless communication units are particularly sensitive to sampling errors when estimating IQ imbalance, which limits the transmit error vector magnitude (TX EVM) in transmit circuitry, or results in poor accuracy in receiver demodulation circuitry.

Previous attempts to correct for these IQ imbalances have relied on adaptive statistical estimation techniques, wherein a reference signal is constructed, using estimates of the effects of the IQ imbalance, and compared to the actual received signal in order to generate an error signal. The error signal is adaptively reduced in order to refine the estimates of the statistics relating to the IQ imbalance, see, for example, U.S. Patent Application Publication US 2006/0029150. This approach is computationally complex, however, and may not be robust enough for all situations. For example, convergence rates may be unacceptably slow. US 20120328041 A1 proposes using a loop back technique for image estimation, albeit that the result will produce a phase imbalance estimate due to the effect of synthesizers.

SUMMARY

The present invention provides a communication unit, and a circuit for digital quadrature (IQ) sampling error estimation and a method therefor, as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Figure 1:
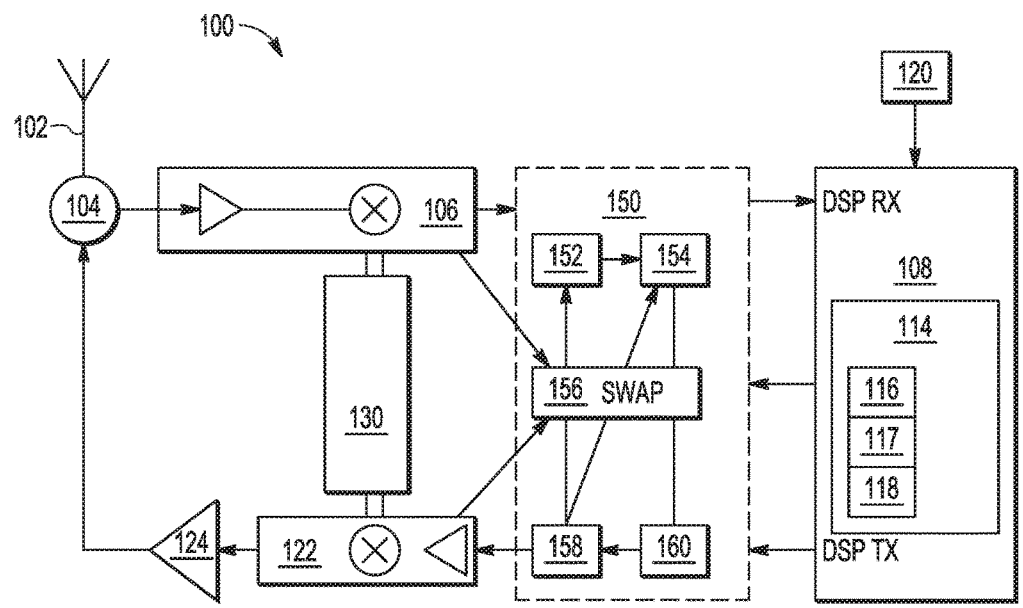
FIG. 1 illustrates a simplified example block diagram of a wireless communication unit, adapted according to example embodiments of the invention.

Examples of the present invention provide a communication unit includes a modem configured to generate a first and second test digital quadrature signal. A transmitter comprises at least one DAC to convert the first and second test digital quadrature signals to first and second test analog quadrature signals. A receiver comprises at least one ADC configured to receive the first and second test analog quadrature signals via first and second quadrature paths and convert the first and second test analog quadrature signals analog to first and second received test digital quadrature signals. An analog loop back path connects the transmitter to the receiver. The modem is configured to: estimate a first sampling error performance associated with the first quadrature path from the first received test digital quadrature signal; estimate a second sampling error performance associated with the second quadrature path from the second received test digital quadrature signal; and generate at least one sampling error compensation signal based on the first estimated performance and second estimated performance to be applied to at least one of the receiver and transmitter.

In some examples, the analog loop back path connects the transmitter to the receiver to enable a quadrature test signal to be routed via both the transmitter and receiver and to be processed internally, thereby constraining and isolating the number of components and circuits that are being considered as contributing to quadrature sampling error. In some examples, the analog loop back path is configured to facilitate two different quadrature paths for a test signal to be routed, thereby supporting two distinct quadrature sampling errors being assessed.

In some examples, the estimate of a first sampling error performance associated with the first quadrature path may be estimated from at least one of: a first signal-to-noise ratio, SNR, of the first received test digital quadrature signal, a first determination of OFDM pilot phase rotation. The estimate of a second sampling error performance associated with the second quadrature path may be estimated from at least one of: a second SNR of the second received test digital quadrature signal; a second determination OFDM pilot phase rotation. In some examples, a slope of the error vector magnitude (EVM) vs. frequency, for the two test signals routed via different quadrature paths, may be generated from an estimate of the sum and difference of the two sampling errors. In some examples, a sampling error compensation may then be effected by adjusting interpolation filters, which in some examples may introduce or adjust delay in a clock signal provided to the DAC and/or ADC. In this manner, image generation due to sampling errors that limits a signal to-noise ratio (SNR) of signals may be avoided.

Thus, examples of the present invention provide a method and architecture to estimate quadrature sampling error produced between ADC 'I' and ADC 'Q' and between DAC 'I' and DAC 'Q' sampling, for example using OFDM signals that are passed through the transmitter DACs, receiver ADCs, and other circuits, such as sample and hold circuit(s) and analog filter(s). In some examples, the analog loop back circuit may be a switchable loop back circuit controllable to switch a test signal between transmitter and receiver quadrature paths. OFDM signals that suffer from a first IQ sampling error through a DAC sample and hold operation in the baseband are processed and a SNR performance is computed in the frequency domain in the receiver path. In some examples, a switch may be used to connect the various circuits and components, such as the quadrature DACs in the transmitter path, to circuits and components, such as the quadrature ADCs, in the receiver path.

Although examples of the invention are described with reference to use of two DACs and two ADCs, it is envisaged that in other examples, one or more DACs and ADCs may be used. For example, the circuits and concepts herein described may be composed with two DACs linked to a single ADC. In this example, alternatively sampling each DAC to monitor the sampling error of the transmit quadrature signal may be performed. Similarly, it is envisaged that in other examples, a single DAC whose outputs are alternatively sampled by the ADC 'I' and the ADC 'Q' may be used in order to monitor the sampling error of the receive quadrature signal.

Examples of the present invention further provide a method and architecture to compensate for the estimated error through use of a suitable compensation component, e.g. one or more interpolation filters, in order to add in delay to 'I' and/or 'Q' clock lines. Examples of the present invention further provide a method and architecture to provide a loop back architecture, for example a switchable loop back circuit with controllable switches or sets of switches, configured to couple a transmitter side to a receiver side of a communication unit, for example for use in a test/calibration mode. In some examples, a two-step measurement of different IQ paths and components is performed. In some examples, different OFDM signals may be applied to each of the two measurements, whereas in other examples the same OFDM signal may be applied to each of the different paths.

Examples of the present invention also provide a scheme that provides a capability to estimate sampling error below 50 ps, using current technology, which results from a new requirement for wireless communication units to support WiFi™ and employ OFDM signals using high bandwidth (80 MHz/160 MHz and more) with deep modulation scheme (256QAM, 1024QAM, etc.). Such low sampling error requirements keep SNR independent from subcarrier frequencies. This level of tracking capability is also useful to avoid loss of SNR in carriers on the edges of an operational OFDM spectrum.

Some examples of the present invention are described with reference to using slopes of determined error vector magnitude (EVM) in a frequency domain, as sampling error produces EVM on data signals. Also, EVM is produced due to a phase rotation of pilot signals, such as OFDM pilot signals. The EVM metric (and thereby its slope over frequency) of the received signal in the frequency domain provides a mechanism to quantify the delay error at such low sampling rates, as natively computed in OFDM receivers by a Fourier Transformation. Alternatively, in some examples with receivers whose processing operates in the time domain, a time domain EVM may be produced by the receiver by using an additional Fourier Transformation to produce a frequency domain EVM slope.

In some examples, the EVM slope may be alternatively computed on each subcarrier or on a subset of OFDM pilots. However, it is envisaged that the inventive concept is equally applicable to other (non-OFDM) communication systems, where there may be a strict signal-to-noise ratio (SNR) requirement. For example, in OFDM systems, there is a strict SNR requirement (where a modulation and coding scheme (MCS) of 9/10 exists) over a relatively large bandwidth (up to 160 MHz).

Examples of the invention are described with regard to a circuit that comprises transmit functionality in both baseband digital and analog form, an analog loop back path, which in some examples is a switchable analog loop back path, and receive functionality in both baseband digital and analog form. In some examples, the circuit may be implemented using discrete components and circuits, whereas in other examples the circuit may be formed in integrated form in an integrated circuit.

Because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Referring first to FIG. 1, an example of a simplified block diagram of a wireless communication unit 100 is illustrated, where the wireless communication unit 100 has been adapted according to example embodiments of the invention. The wireless communication unit 100 comprises a receiver and a transmitter, shown as distinct circuits and paths. The wireless communication unit 100 comprises an antenna 102 operably coupled to an isolation component or circuit 104, which may be a duplex filter or antenna switch that isolates signals between the transmitter and receiver circuits.

One or more receiver chains, as known in the art, include(s) receiver front-end circuitry 106 (effectively providing reception, low-noise amplification, filtering and intermediate or base-band frequency conversion). In example embodiments, the receiver receives a radio frequency, RF, signal and converts the received RF signal to a digital quadrature received signal. The receiver front end circuit 106, for example, may comprise a low noise amplifier (LNA) coupled to two frequency down-conversion quadrature mixers. Frequency down-conversion mixers mix the amplified signal from the LNA with quadrature local oscillator signals 'I' and 'Q' received from quadrature local oscillator circuit 130 and output the frequency down-converted quadrature signals to low pass filter(s) (LPFs) (not shown).

The receiver front end circuit 106 is coupled to a baseband (BB) circuit, which may be in a form of a baseband integrated circuit (BBIC) 150. The BBIC 150 comprises receive (RX) IQ channel low pass filters (LPFs) 152 and IQ ADCs 154. In this example, IQ ADCs provide IQ analog to digital conversion of the IQ receive signals and are coupled to a Fast Fourier Transform (FFT) engine (not shown) in digital processing unit 120, in order to demodulate orthogonal frequency division multiplex (OFDM) signals and outputs.

The wireless communication unit 100 comprises one or more signal processor(s) 108, which may be of the form of a digital signal processor (DSP). In this example, the signal processor 108 comprises a controller 114 that maintains overall operational control of the wireless communication unit 100. The controller 114 is also coupled to the receiver front-end circuitry 106, and BB integrated circuit 150. In some examples, the controller 114 is also coupled to a buffer module 117 and a memory device 116 that selectively stores operating regimes, such as decoding/encoding functions, synchronization patterns, code sequences, equalization, OFDM demodulation parameters associated with its frequency de-mapping and SNR estimation, etc. In accordance with example embodiments of the invention, the memory device 116 may also store data relating to sampling error estimation, e.g. EVM slope versus frequency data, equalized OFDM pilot data, protocol data unit OFDM symbols, compensation values, default delay data, etc. A timer 118 is operably coupled to the controller 114 to control the timing of operations (e.g. transmission or reception of time-dependent signals) within the wireless communication unit 100. In other examples, the signal processor 108 can also be natively found in an OFDM modem.

In a transmitter chain sense, the transmitter comprises the one or more signal processor 108, which may be of the form of a digital signal processor (DSP), and (in this example) two quadrature digital-to-analog converters (DACs) 160 and anti-aliasing filter 158. Two quadrature DACs 160 are required for phase amplitude modulated (PAM) OFDM signals in this example that is a Cartesian architecture as one aim of this architecture is to compensate their relative sampling error. The two DACs perform quadrature conversion of the transmit digital signals to an analog form, with one DAC dedicated for the quadrature 'Q' path and one DAC dedicated for the quadrature 'I' path. In this example, BBIC 150 outputs analog quadrature signals to quadrature frequency up-conversion circuit 122, which contains quadrature up-mixer circuit(s) and may contain amplification and additional filtering circuits. The frequency up-conversion circuit 122 combines the two resultant mixed quadrature signals before being input to power amplifier (PA) 124, which amplifies the combined signal prior to transmission. PA 124 outputs the up-converted and amplified transmit signal to isolation component or circuit 104 and thereafter antenna 102. Thus, the transmitter comprises the two DACs 160 arranged to receive a digital quadrature transmit signal and the digital quadrature transmit signal is converted to a RF signal for transmission in the transmitter chain.

A known problem with wireless communication units supporting quadrature modulation schemes is the effect of I/Q mismatch, between the respective quadrature paths, which can cause undesirable I/Q imbalance between the two quadrature signal paths. Quadrature mismatch/imbalances are generally caused by one or more of: a gain error between the frequency down-conversion quadrature mixers; phase error between the quadrature local oscillator signals; and any gain error between the ADCs 154 and DACs 160. It is also known that frequency independent parts of the receiver LPFs, and the transmitter LPFs may also contribute to the gain error, and thereby quadrature mismatch/imbalance.

In accordance with some example embodiments, a switchable analog loop back path 156 is included, for example in BB IC 150, which links analog circuits between the receiver and transmitter. In accordance with some examples (not shown), the switchable analog loop back path 156 may be controlled by, say, a demodulator or signal processor 108 or controller 114. In accordance with some examples, a processor, which in some instances may be processor 108, is configured to receive quadrature analog signals from each of the transmitter and receiver chains; measure signal-to-noise ratio values, determine EVM versus frequency on each subcarriers (e.g. OFDM subcarriers) or on OFDM pilots, and/or estimate a quadrature sampling error between multiple quadrature paths in the transmitter and multiple quadrature paths in the receiver. In some examples, one or more test signals are routed via the multiple quadrature paths to enable sampling error to be determined.

In some examples, a modem (encompassing a modulator and a demodulator) may be used to produce an orthogonal frequency division multiplex (OFDM) signal and used to demodulate the looped back OFDM signal, in order to provide a signal-to-noise ratio (SNR) estimation, in a frequency domain, of the effect on the OFDM signal caused by the intervening components and circuits. Hereafter, the term modem is used to encompass both modulator and demodulator functions, depending upon the signal processing function being employed. The OFDM demodulator, for example located in signal processor 108, may also be used to quantify any phase shift of pilots over pilot index, thereby providing EVM vs frequency estimation and sampling error measurement.

In some examples, multiple quadrature signals may be measured using a swapping arrangement of the quadrature paths, for example using the switchable analog loop back path 156. For example, swapping quadrature (IQ) paths may be performed to produce a two-step measurement of the two errors in the transmit chain and receive chain. For example, switchable analog loop back path 156 may be used, say, to either connect the transmit 'I' path to the receive 'I' path or the receive 'Q' path (and connect the transmit 'Q' path to the receive 'Q' path or the receive 'I' path.

In some examples, the quadrature sampling error may be calculated from a difference and a sum of sampling between the respective quadrature paths. Once the modem (or signal processor 108) has determined a sampling error, for example based on SNR values and then determined slopes of EVM versus frequency, the modem (or signal processor 108) generates a compensation signal, which may be applied to at least one of the receiver ADC and associated circuits and components and/or transmitter DAC and associated circuits or components, in order to compensate for the estimated quadrature sampling errors of the TX and RX.

A skilled artisan will appreciate that the level of integration of receiver circuits or components may be, in some instances, implementation-dependent.

Furthermore, the signal processor module in the transmit chain may be implemented as distinct from the signal processor in the receive chain. Alternatively, a single processor 108 may be used to implement a processing of both transmit and receive signals, as shown in FIG. 1, as well as some or all of the BBIC functions. Clearly, the various components within the wireless communication unit 100 can be realized in discrete or integrated component form, with an ultimate structure therefore being an application-specific or design selection.

Figure 2:
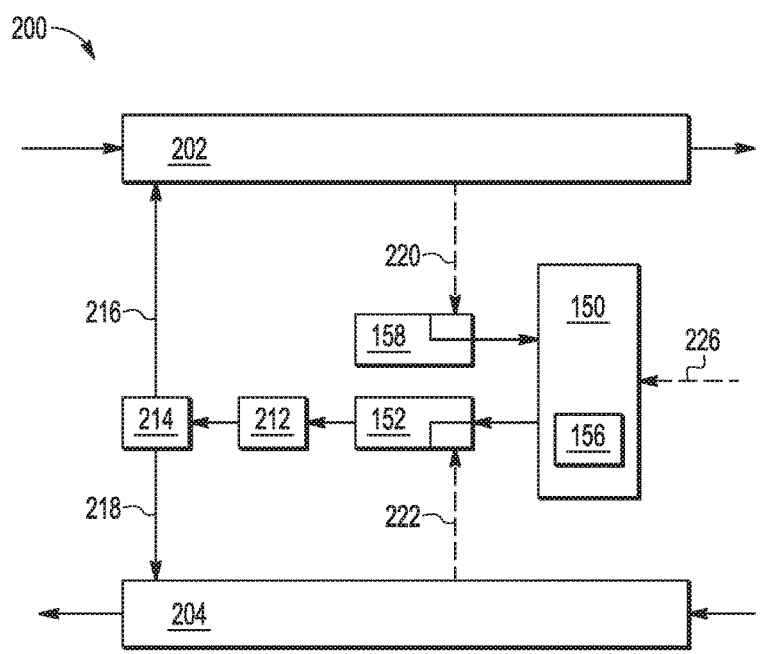
FIG. 2 illustrates a simplified example block diagram of a processor and compensation circuit, according to example embodiments of the invention.

Referring now to FIG. 2, a more detailed block diagram of an example baseband circuit 200, such as BB integrated circuit 150 of FIG. 1, is illustrated. In a test mode, the transmit circuit is coupled to the receive circuit via the analog feedback path 156, which comprises a series of switches and is controllable by at least one switch enable signal 226. The example baseband circuit 200 also comprises a transmit modem 158 for generating a test OFDM signal to be routed to the receive modem 152 via the switchable analog loop back path 156. The transmit modem 158 is coupled to a transmit post compensation circuit 202 and a receive modem 152 coupled to a receive post compensation circuit 204. In this example, the transmit modem 158 and receive modem 152 are illustrated as being located external to BBIC 150.

Coupled to the receive modem 152 is a slope determination circuit 212, which determines slopes of EVM vs. frequency for multiple quadrature signals routed through the transmit modem 158, switchable analog loop back path 156 and receive modem 152, in order to provide the EVM slopes or measurement values relating thereto to a sampling error estimation circuit 214 that generates an estimate of the sum and difference of the two sampling errors, i.e. a transmit sampling error between the DAC 'I' and 'Q' paths and a receive sampling error between the ADC 'I' and 'Q' paths.

Without loss of generality, OFDM pilots can also be used to estimate the sampling error. Therefore, alternatively, the slope determination circuit 212 and sampling error estimation circuit 214 may determine EVM (which may also be expressed in term of phase rotation of the OFDM pilots) according to the IQ swap performed by the switchable analog loop back path 156 in order to estimate the sampling error ($\delta$):

$$(\alpha_k^n)_{out} = (\alpha_k^n) + j2\pi f_c k \delta (\alpha_{-k}^n)^* \quad [1]$$

$$(\alpha_{-k}^n)_{out} = (\alpha_{-k}^n) + j2\pi f_c k \delta (\alpha_k^n)^* \quad [2]$$

Here, let k1, −k1, k2 and −k2 carrier indexes dedicated to the pilots, for example with k1=7, k2=21 for legacy 802.11a OFDM, equations [1] and [2] above become (removing the pilot polarity per symbol):

$$\text{with } (\alpha_{-21}^n)=1, (\alpha_{-7}^n)=1, (\alpha_7^n)=1, (\alpha_{21}^n)=-1 \quad [3]$$

$$(\alpha_7^n)_{out} = 1 + j2\pi f_c 7\delta$$

$$(\alpha_{-7}^n)_{out} = 1 - j2\pi f_c 7\delta$$

$$(\alpha_{-21}^n)_{out} = 1 + j2\pi f_c 21\delta$$

$$(\alpha_{21}^n)_{out} = -1 + j2\pi f_c 21\delta \quad [4]$$

While the samples transmitted are real, the error occurs in the imaginary domain. The sampling error is then estimated by averaging over the four pilots of the number of symbols (Nsymb), according to equations [5] and [6].

$$\delta_{-21} = \frac{1}{Nsymb} \sum_{n=1}^{Nsymb} \frac{\text{abs}((a_{-21}^n)_{out} - 1)}{2\pi f_c(21)} \equiv f_{21} \quad [5]$$

$$\delta_{estim} = \frac{1}{4} \Sigma_{k=-21,-7,7,21} f_k \quad [6]$$

The expression in equation [6] may be expressed in term of slope of EVM versus frequency with:

$$EVM_k^n \equiv \frac{(a_k^n)_{out} - (a_k^n)}{(a_{-k}^n)^*} = j2\pi f_c k \delta \quad [7]$$

$$2\pi\delta = \frac{EVM_{k2}^n - EVM_{k1}^n}{jf_c(k2 - k1)} \quad [8]$$

In this example, the transmit modem 158 is envisaged as comprising a modulator coupled to two DACs, two transmit sample and hold circuits and two analog low pass filters (LPFs). Similarly, in this example, the receive modem 152 is envisaged as comprising two ADCs, two receive sample and hold circuits and two analog LPFs. The values of these two sampling errors 216, 218 determined from applying one or two test signals to different quadrature paths are provided to:

(i) a transmit digital post compensation circuit 202 of the sampling error TX estimate $\hat{\delta}_{tx}$, which provides a transmit compensation signal 220 according to equation [9], upon receipt of transmit sampling error 216:

$$I_{tx_{correction}}(nTs) = \\ I_{tx_{reference}}(nTs) - \hat{\delta}_{tx} \times \left[ \frac{I_{tx_{reference}}(nTs) - I_{tx_{reference}}((n-1)Ts)}{Ts} \right] \quad [9]$$

(ii) a receive digital post compensation circuit 204, which provides a receive compensation signal 222 of the sampling error RX estimate $\hat{\delta}_{rx}$, according to equation [10], upon receipt of a receive sampling error 218:

$$I_{rx_{correction}}(nTs) = \quad [10]$$
$$I_{rx_{reference}}(nTs) - \widehat{\delta_{rx}} \times \left[ \frac{I_{rx_{reference}}(nTs) - I_{rx_{reference}}((n-1)Ts)}{Ts} \right]$$

The sampling compensations are applied on oversampled IQ samples at the ADCs output or DACs input. In this example, with 'I' compensation values being determined in equations [9] and [10], the Q channels remain unchanged.

Figure 3:
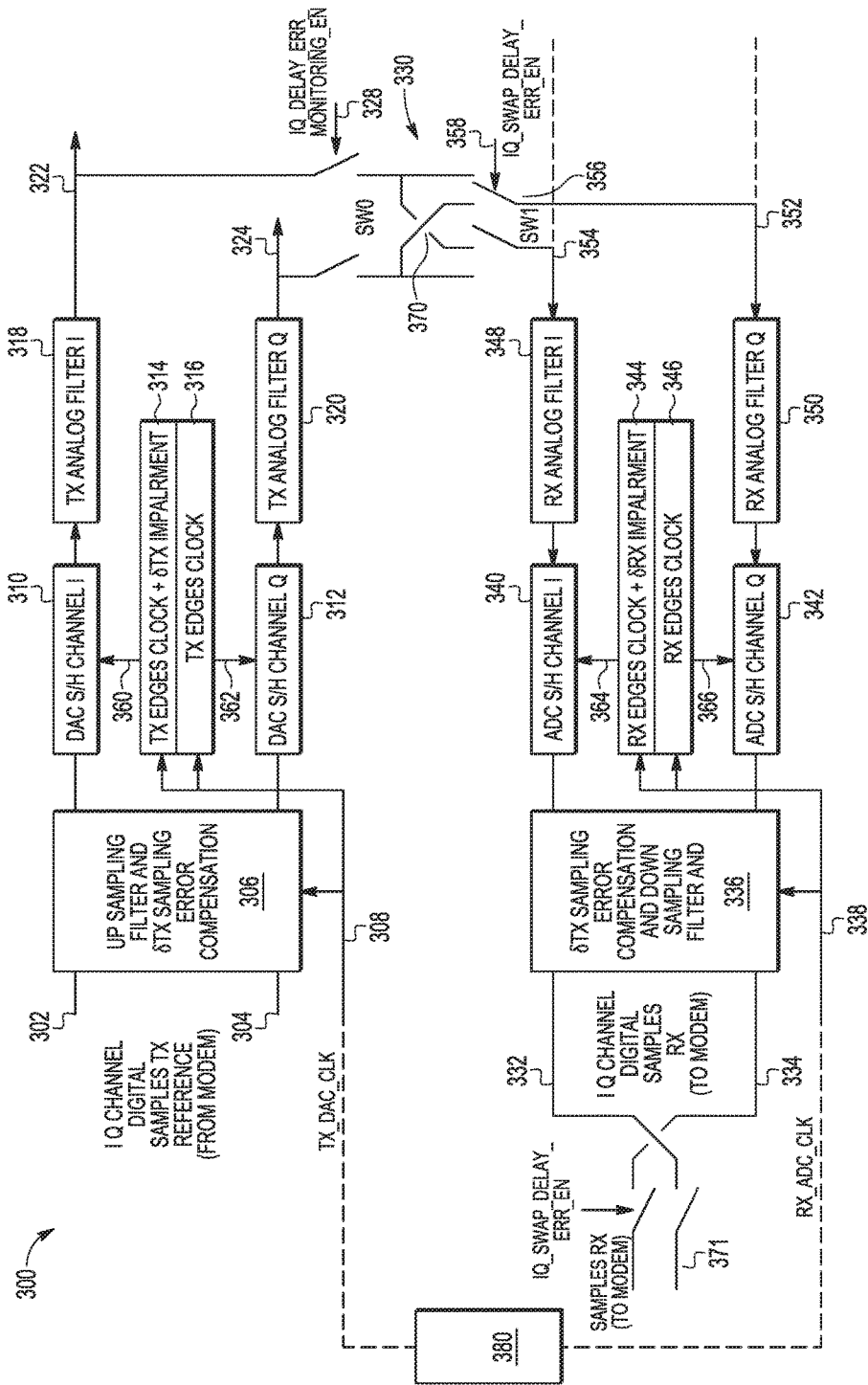
FIG. 3 illustrates a more detailed example block diagram showing a switchable loop back and compensation architecture, according to example embodiments of the invention.

Referring now to FIG. 3, a more detailed example block diagram 300 illustrates one switchable loop back circuit and compensation architecture, according to example embodiments of the invention. In this example, the loop back circuit and compensation operation may be performed in a test/calibration mode, which is different to a normal transmit and receive mode of operation. In accordance with example embodiments, a transmit modem (for example transmit modem 158 of FIG. 1) provides quadrature OFDM digital samples 302, 304 to an up-sampling filter and sampling error compensation circuit 306 (for example DAC 160 of FIG. 1). The quadrature outputs from the up-sampling filter and sampling error compensation circuit 306 are input to respective quadrature DAC sample and hold circuits 310, 312. In some examples, a digital word in the 'I' or 'Q' path applied to the analog section of the DAC sample and hold circuits 310, 312 is left constant under the sampling frequency, which produces a sample and hold transfer function natively. Any quadrature misalignment between the outputs from the respective quadrature DAC sample and hold circuits 310, 312 may be represented by an error vector magnitude (EVM) signal or a pilot phase rotation. The value of such an EVM signal increases linearly with a carrier index. The rotation of the pilots increases with higher pilot carrier index (e.g. index 21 as compared to index 7 for 802.11a, for example).

The outputs from the respective quadrature DAC sample and hold circuits 310, 312 are input to respective transmit analog filter circuits (e.g. low pass filters (LPF)) 318, 320.

In examples of the invention, it is envisaged that the switchable loop back circuit 330 may connect transmit analog filter circuits 318, 320 to respective quadrature switchable ADC sample and hold circuits 340, 342. In further alternative examples, it is envisaged that the switchable loop back circuit 330 may connect respective quadrature switchable DAC sample and hold circuits 310, 312 to respective receive analog (e.g. LPF) filter circuits 348, 350, for example should digital aliasing spurious signals be filtered enough to not impact the EVM floor required by error sampling accuracy.

In normal operation, the filtered outputs 322, 324, from respective quadrature transmit analog filter circuits 318, 320 will be up-converted in the transmit chain.

In accordance with example embodiments, however, in a test mode of operation, an analog loop back operation is enabled through control signals applied to switchable loop back circuit 330. In this example, switchable loop back circuit 330 comprises a first set of switches (SW0) 326, a second set of switches (SW1) 356 and a cross-over path 370, in order to effect an optional swap over between quadrature 'I' & 'Q' paths, from a transmit chain to a receive chain.

In accordance with this example, the configuration of the switching circuit 330 may be controlled through two signals: an IQ_DELAY_ERR_MONITORING_EN signal 328, controlling the first set of switches (SW0) 326, which dictates whether a normal or test mode of operation is performed, and an IQ_SWAP_DELAY_ERR_EN signal 358 controlling the second set of switches (SW1) 356, which dictates which quadrature path from the transmit chain is coupled to which quadrature path in the receive chain. In this manner, the quadrature ('I' or 'Q') transmit OFDM signal can be routed to either the receive ADC 'I' circuit through path 354 or the receive ADC 'Q' circuit through path 352. Thus, in the test/calibration mode, a transmit quadrature signal (from either the transmit 'I' path or 'Q' path) will be routed to a respective receive ADC 'I' circuit path 354 or receive ADC 'Q' circuit path 352, and thereafter input to a respective receive analog filter circuit 348, 350 for filtering. The filtered output from the respective receive analog filter circuit 348, 350 is input to a respective quadrature sample and hold ADC circuit 340, 342. The quadrature sample and hold ADC circuits 340, 342, and any related peak detector (not shown), may be elementary analog memory devices that are typically used in ADCs to eliminate variations in input signal that can corrupt the conversion process. The output from the respective quadrature sample and hold ADC circuit 340, 342 is applied to down-sampling filter and sampling error compensation circuit 336. Any quadrature misalignment between the two quadrature paths in the receiver chain, for example due to the sample and hold circuit 340, 342 and/or down-sampling filter and sampling error compensation circuit 336 will produce a reduction in the signal-to-noise ratio (SNR). A loss of SNR increases linearly with carrier index. Thereafter, the output from the down-sampling filter and sampling error compensation circuit 336 is input to a receiver modem 380 that provides quadrature OFDM equalization, in normal operation. Switch (SW1) 356 in the digital domain is used and controlled according to IQ_SWAP_DELAY_ERR_EN signal 358 so that the IQ presented to the receiver modem 380 is never swapped. Otherwise, the receiver modem 380 would not be able to perform synchronization, equalization and de-mapping successfully. In some examples, in a test mode of operation, receiver modem 380 may be used to estimate the sampling error and update the filter coefficients in up-sampling filter and sampling error compensation circuit 306 and down-sampling filter and sampling error compensation circuit 336 digital units to compensate for the impairment.

In accordance with example embodiments, an OFDM signal generated in a transmit modem is routed through up-sampling filter and sampling error compensation circuit 306, DAC quadrature sample and hold circuits 310, 312 and transmit analog filter circuits 318, 320. In some examples, the transmit sampling clock of the DAC updates digital words sent to the analog section of the DAC. The OFDM signal generated in a transmit modem suffers from a first quadrature (IQ) sampling error through the DAC quadrature sample and hold circuits 310, 312. In this first step, the transmit 'I' path is connected to the receive 'I' path and the transmit 'Q' path is connected to the receive 'Q' path, via switchable loop back circuit 330. These signals are fed back to the receive analog filter circuits 348, 350 and down-sampling filter and sampling error compensation circuit 336, where they suffer from a second quadrature (IQ) sampling error, as a result of ADC sample and hold operations.

A mathematical description of a determination of a sampling error using a two-step measurement approach, for example with a quadrature loop back swap between transmit and receive quadrature paths is shown below in equations [11] and [12]. Here, an assessment of both the sum and difference of the sampling error may be achieved, according to the quadrature IQ swapping operation.

IQ Swap Delay ERR EN=0:

Here, in a quadrature swapping configuration with a Swap_IQ=0, a loop back configuration produces a combined delay $\delta_{tx}+\delta_{rx}$ between transmit I channel (or respective Q channel) and receive I channel (or respective Q received channel) through the analogue loop back):

$$I_{out}(t')+jQ_{out}(t')=I_{ref}(t'+\delta_{tx}+_{rx})+jQ_{ref}(t') \quad [11]$$

With $t=t'+(\delta_{tx}+\delta_{rx})/2$ $$I_{out}(t) + jQ_{out}(t) = I_{ref}\left(t + \frac{\delta_{tx} + \delta_{rx}}{2}\right) + jQ_{ref}\left(t - \frac{\delta_{tx} + \delta_{rx}}{2}\right) \quad [12]$$

The SNR of the received and demodulated quadrature signals is impacted due to the respective transmit (Tx) and receive (Rx) sampling errors $$\frac{\delta_{tx} + \delta_{rx}}{2},$$

as can be determined by the receiver modem 380. This signal (with Tx-I connected to Rx-I, and Tx-Q connected to Rx-Q) is demodulated in base band, and a SNR in the frequency domain is computed by receiver modem 380. Thus, a first computed slope of the EVM vs frequency, performed by the receiver modem 380 (or a signal processor coupled thereto), is able to provide a first sampling estimate of the sum of the two sampling errors, i.e. a transmit sampling error between the DAC 'I' and 'Q' paths and a receive sampling error between the ADC 'I' and 'Q' paths.

In accordance with a second step, a swap over of quadrature paths is effected by switching switchable loop back circuit 330, and in particular switching second set of switches (SW1) 356, such that the transmit 'I' path is connected to the receive 'Q' path and the transmit 'Q' path is connected to the receive 'I' path. The swap over of quadrature paths thereby facilitates providing two distinct SNR measurements, which allows for two impairments to be assessed.

IQ Swap Delay_ERR EN=1:

Here, in a quadrature swapping configuration with a Swap_IQ=1, a loop back configuration produces a 'difference' delay $\delta_{tx}-\delta_{rx}$ between transmit I channel (or respective Q channel) and receive I channel (or respective Q received channel) through the analogue loop back):

$$I_{out}(t')+jQ_{out}(t')=I_{ref}(t'\delta_{tx})+jQ_{ref}(t'\delta_{rx}) \quad [13]$$

With $t''=t'+\delta_{rx}$ $$I_{out}(t'')+jQ_{out}(t'')=I_{ref}(t''\delta_{tx}-\delta_{rx})+jQ_{ref}(t'') \quad [14]$$

With $t=t''(\delta_{tx}-\delta_{rx})/2$ $$I_{out}(t) + jQ_{out}(t) = I_{ref}\left(t + \frac{\delta_{tx} - \delta_{rx}}{2}\right) + jQ_{ref}\left(t - \frac{\delta_{tx} - \delta_{rx}}{2}\right) \quad [15]$$

Thereafter, a further switch 371, acting in the digital domain in FIG. 3, swaps the configuration back to Transmit 'I' to Receive 'I' and Transmit 'Q' to Receive 'Q'. This transformation is identified in the IQ_SWAP_DELAY_ERR_EN=1 case:

Again, the quadrature transmit signals are fed back to the receive analog filter circuits 348, 350 and down-sampling filter and sampling error compensation circuit 336, where they suffer from a second quadrature (IQ) sampling error $$\frac{\delta_{tx} + \delta_{rx}}{2}$$

through ADC sample and hold.

The SNR of the received and demodulated quadrature signals is impacted due to the respective transmit and receive sampling errors, as can be determined by the receiver modem 380. This signal (with Tx-I connected to Rx-Q, and Tx-Q connected to Rx-I) is demodulated in base band and a SNR in the frequency domain is computed by receiver modem 380. Thus, a second computed slope of the EVM vs frequency, performed by the receiver modem 380 (or a signal processor coupled thereto), is able to provide a second sampling estimate of a difference between the two sampling errors, i.e. a transmit sampling error between the DAC 'I' and 'Q' paths and a receive sampling error between the ADC 'I' and 'Q' paths.

In order to compute the sampling error $\delta$ in a unitary channel, an estimate of the relative error in the frequency domain of sample $(a_k^n)$ attached to the kth subcarrier index of the nth OFDM symbol from its $(a_k^n)_{out}$ measurement: may be described in equation [16] as:

$$EVM(n, k) = \left|\frac{(d_k^n)_{out} - (d_k^n)}{(d_k^n)^*}\right| = 2\pi f_c k \delta \quad [16]$$

One possible estimate of the sampling error S from EVM slope between carrier indexes $k_1$ and $k_2$ in the frequency domain is:

$$\delta = \frac{1}{2\pi Nsymb} \sum_{n=1}^{Nsymb} \frac{EVM(n, k_2) - EVM(n, k_1)}{(k_2 - k_1)f_c} \quad [17]$$

Using the two measurements described above, $\delta_{tx}$ and $\delta_{rx}$ are deduced from:

$$\frac{\delta_{tx} - \delta_{rx}}{2} = \frac{1}{2\pi Nsymb} \quad [18]$$

$$\sum_{n=1}^{Nsymb}\left[\frac{[EVM(n, k_2) - EVM(n, k_1)]}{(k_2 - k_1)f_c}\right]_{IQ\_SWAP\_DELAY\_ERR\_EN=1}$$

$$\frac{\delta_{tx} + \delta_{rx}}{2} = \quad [19]$$

$$\frac{1}{2\pi Nsymb}\sum_{n=1}^{Nsymb}\frac{[EVM(n, k_2) - EVM(n, k_1)]}{(k_2 - k_1)f_c}\bigg|_{IQ\_SWAP\_DELAY\_ERR\_EN=0}$$

Equivalently, $$\delta_{rx} = \frac{1}{2\pi Nsymb} \quad [20]$$

$$\sum_{n=1}^{Nsymb} \left[ \frac{[EVM(n, k_2) - EVM(n, k_1)]}{(k_2 - k_1)f_c} \bigg|_{IQ\_SWAP\_DELAY\_ERR\_EN=0} - \frac{[EVM(n, k_2) - EVM(n, k_1)]}{(k_2 - k_1)f_c} \bigg|_{IQ\_SWAP\_DELAY\_ERR\_EN=1} \right]$$

$$\delta_{tx} = \frac{1}{2\pi Nsymb} \quad [21]$$

$$\sum_{n=1}^{Nsymb} \left[ \frac{[EVM(n, k_2) - EVM(n, k_1)]}{(k_2 - k_1)f_c} \bigg|_{IQ\_SWAP\_DELAY\_ERR\_EN=1} + \frac{[EVM(n, k_2) - EVM(n, k_1)]}{(k_2 - k_1)f_c} \bigg|_{IQ\_SWAP\_DELAY\_ERR\_EN=0} \right]$$

The sample ($\alpha_k''$) may be known a priori for 'k' indexes belonging to the subset of carriers attached to OFDM pilots, or may be known a posteriori from an equalizer output decision, in order to minimize the sample error over a subset of samples attached to the modulation coding scheme used. Advantageously, the receiver modem 380 performs this sampling error assessment and/or slope computation digitally.

Thus, in some examples, the switchable analog loop back path may be considered as a mechanism to de-correlate the transmit and receive sampling errors, when two or more alternative routing paths may be selected.

After determining the transmit sampling error and receive sampling error between the respective 'I' and 'Q' paths, the receiver modem 380 (or signal processor coupled thereto) is able to generate filter coefficients to interpolate reference samples from the up-sampling filter and sampling error compensation circuit 306. In the example of FIG. 3, a set of interpolation filters 314, 344 coupled to up-sampling filter and sampling error compensation circuit 306 and down-sampling filter and sampling error compensation circuit 336, may be independently controlled and updated/adjusted. In FIG. 3, each interpolation filter in up-sampling filter and sampling error compensation circuit 306 and down-sampling filter and sampling error compensation circuit 336 blocks, provides a digital time shift between their digital input and digital output, as described by equations [9] and [10], related to an identified delay error, to a respective one of the DAC quadrature sample and hold circuits 310, 312 or ADC quadrature sample and hold circuits 340, 342. The two interpolation filters 314, 344, apply a delay in the digital domain. In this manner, the two estimates are used to provide coefficients to adjust transmit digital filter 314 to compensate transmit sampling error in the transmit path and to provide coefficients to adjust receive digital interpolation filter 344 to compensate receive sampling error in the receive path.

In accordance with examples of the invention, the described system, communication units, circuits, and test method provide an accurate way to measure and compensate for quadrature sampling error. Advantageously in a baseband loop back test mode of operation, the thermal noise contribution of the overall system is low. This increases the accuracy of the sampling error estimation. In addition, the architecture benefits from removing other sources of the image (e.g. from mixers) to better isolate the various contributors of sampling error.

Figure 4:
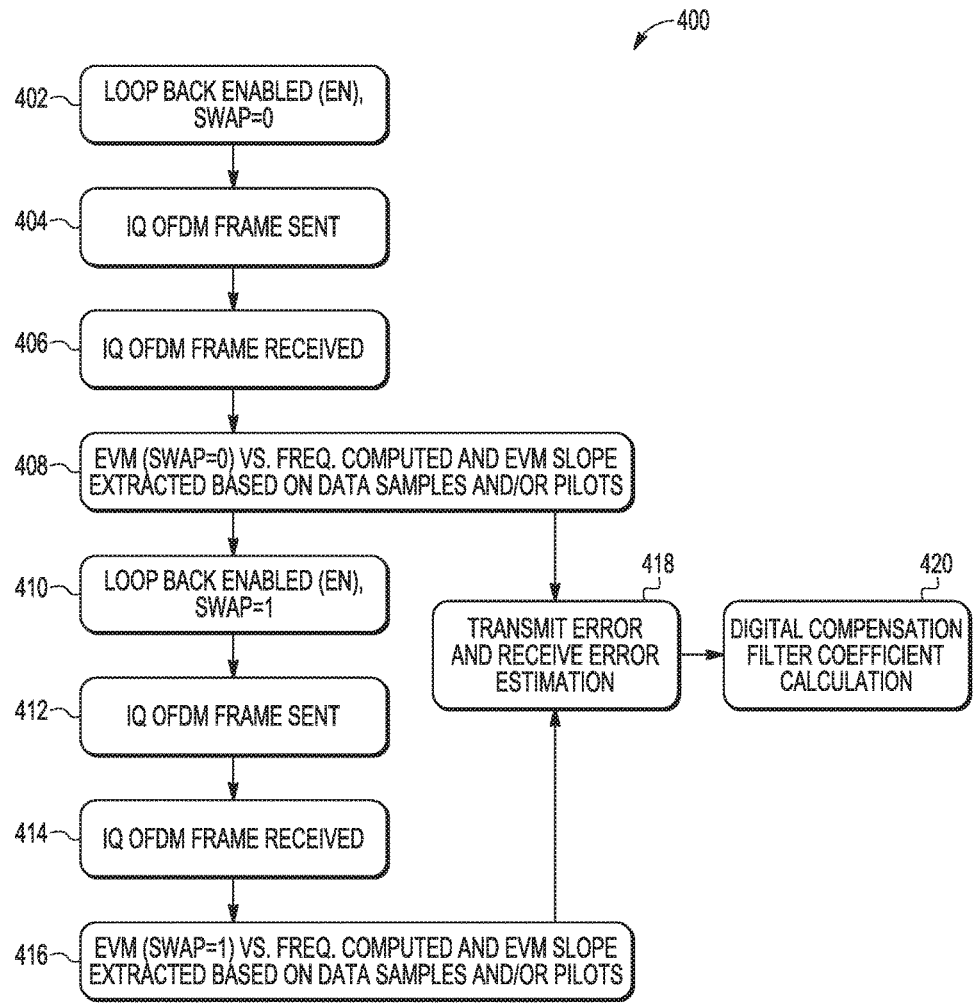
FIG. 4 illustrates an example flow chart for determining an IQ sampling error estimate and thereafter compensating for the estimated error, according to example embodiments of the invention.

FIG. 4 illustrates an example flowchart 400 for determining an IQ sampling error estimate and thereafter compensating for the estimated error, according to example embodiments of the invention. The flowchart 400 commences with a switchable loop back path being enabled in 402. Once enabled, a quadrature OFDM signal (for example in a form of a transmit 'frame') is sent, in 404, from a first quadrature transmit path and received in 406 at one of the quadrature paths in the receiver, dependent upon the selected switchable loop back path. A first error vector magnitude (EVM) versus frequency slope is then determined, based on data samples and/or pilots, in 408. The switchable loop back path is switched in 410. Once enabled, a further (or the same) quadrature OFDM signal (for example in a form of a transmit 'frame') is sent in 412 from a quadrature transmit path and received in 414 at the other one of the quadrature paths in the receiver, dictated by the selected switchable loop back path. A second error vector magnitude (EVM) versus frequency slope is then determined, based on data samples and/or pilots, in 416. The two respective (first and second) EVM versus frequency slopes are then processed, for example by adding and subtracting them, in order to determine a transmit sampling error and a receive sampling error estimation in 418. Once the transmit sampling error estimate and receive sampling error estimate have been calculated in 418, digital compensation coefficients may be applied to, say digital compensation interpolation filters in 420.

Figure 5:
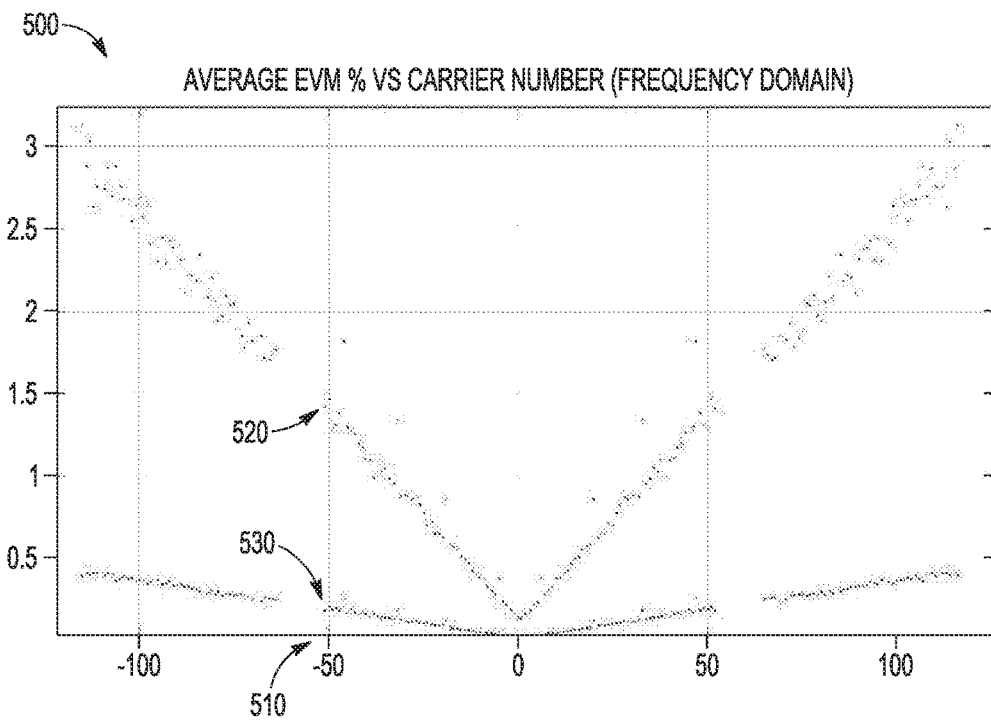
FIG. 5 illustrates an example of a graph showing a use of EVM slopes in order to determine an IQ sampling error estimate, according to example embodiments of the invention.

Referring now to FIG. 5, an example graph 500 illustrates two plots 520, 530 of possible EVM slopes (where EVM is measured in % versus the subcarrier indexes 510 in an OFDM spectrum (where the frequency is deduced by index_carrier×312.5 kHz)). A '%' unit is illustrated to obtain linear dependency between EVM and carrier index (or frequency). In this example, the carrier spacing is 312.5 kHz, according to the 802.11ac standard, with the carrier index being illustrated from −120 to 120 (equivalent to −37.5 MHz to +37.5 MHz). The two plots 520, 530 of EVM slopes result from a summation and a difference between the determined quadrature sampling errors and are used in determining an IQ sampling error estimate and compensation values, for example to adjust interpolation filters as described with reference to FIG. 3, according to example embodiments of the invention.

As illustrated, the EVM slope for the summation of the sampling errors is seven times the sampling error differences, from a ratio of 175/25. For example, FIG. 5 illustrates a total sampling error, when summed, of: 75+100 psec=175 psec for first EVM slope 520, and a total sampling error of the difference of: 75-100 psec=−25 psec, for second EVM slope 530.

In this manner, the receive modem 380 (or signal processor 108) is able to apply 75 psec delay compensation to the DAC clock 360 applied to the DAC sample and hold circuit 310. Similarly, the modem 380 (or signal processor 108) is able to apply 100 psec delay compensation to the sampling clock 362 applied to the DAC applied to the DAC sample and hold circuit 312. Similar delay compensations via adjusting a delay of a clock signal, e.g. ADC clock 364 and sampling clock 366 may be applied to the ADC transmit sample and hold circuits 342, 340 of FIG. 3.

Figure 6:
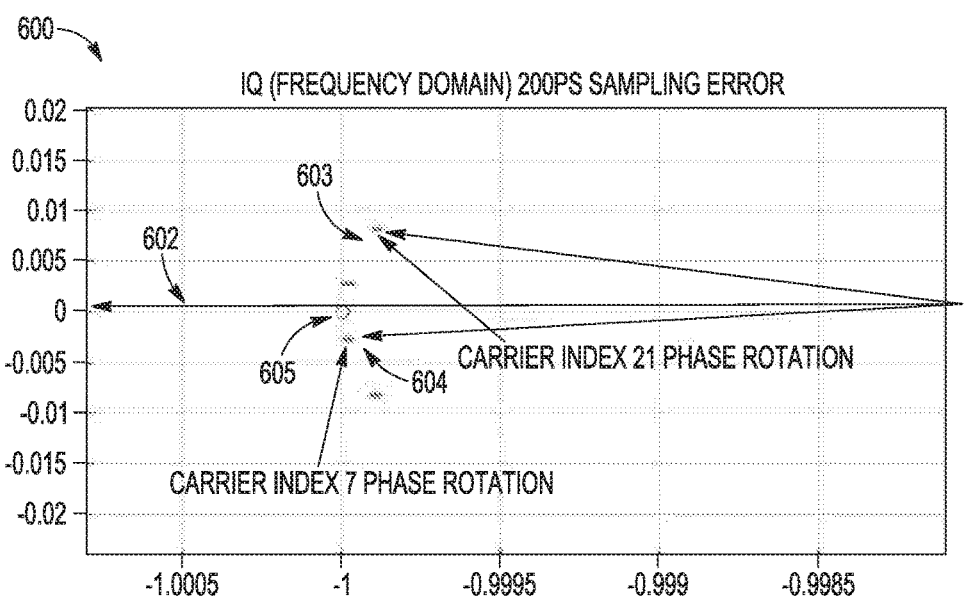
FIG. 6 illustrates an example of a graph showing a use of carrier index phase rotation, according to example embodiments of the invention.

Referring now to FIG. 6, an example graph 600 illustrates a determined sampling error of 200 psec in the frequency domain. In particular, example graph 600 illustrates various phase rotations of OFDM pilots from a quadrature IQ reference point 605. The example graph 600 has been illustrated using the two carrier indexes identified in equation [3] to [6]. Any phase rotation from a zero sampling error axis 602 of quadrature (IQ) constellation points, such as phase rotated constellation point 603, is linked to a carrier index 21. Similarly, any phase rotation from zero sampling error axis 602 of quadrature (IQ) constellation, such as phase rotated constellation point 604, is linked to carrier index −7. The phase rotation error from the IQ reference point 605 in radians equals the EVM. Thus, an EVM slope may be determined in the frequency domain based on OFDM pilot rotation and provide a metric to be used in determining a sampling error.

In this manner, the slope of phase error (equivalent to EVM) versus the subcarrier indexes of pilots provides an estimate of the transmit and receive sampling errors, to be used in equations [9] and [10].

To assist the reader in understanding the origins of equation [1], the following explanation is provided.

Equation [22] describes a set of equations that relate to a mathematical description of a sampling error in an OFDM signal.

$$I_{ref}(t) + jQ_{ref}(t) = \sum_{k=-\frac{N_C}{2}}^{k=+\frac{N_C}{2}} a_k(n)e^{j2\pi f_c kt} \quad [22]$$

Where:
- $a_k(n)$ is a complex number on the kth subcarrier of the $n^{th}$ OFDM symbol to be transmitted.
- $N_c$ is the number of subcarriers (52 in HT20)
- Fc is defined as inter-carrier spacing (312.5 kHz in 802.11 OFDM agn standards)

$$I_{out}(t) = jQ_{out}(t) = I_{ref}\left(t+\frac{\delta}{2}\right) + jQ_{ref}\left(t-\frac{\delta}{2}\right) \quad [23]$$

$$I_{out}(t) + jQ_{out}(t) \cong I_{ref}(t) + jQ_{ref}(t) + \frac{\delta}{2}\frac{dI_{ref}(t)}{dt} - j\frac{\delta}{2}\frac{dQ_{ref}(t)}{dt} \quad [24]$$

$$I_{ref}(t) + jQ_{ref}(t) = \sum_{k=-\frac{N_C}{2}}^{k=+\frac{N_C}{2}} (REa_k^n + jIMa_k^n)(\cos(2\pi f_c kt) + j\sin(2\pi f_c kt)) \quad [25]$$

$$I_{ref}(t) = \sum_{k=-\frac{N_C}{2}}^{k=+\frac{N_C}{2}} (REa_k^n \times \cos(2\pi f_c kt) + IMa_k^n \times \sin(2\pi f_c kt)) \quad [26]$$

$$Q_{ref}(t) = \sum_{k=-\frac{N_C}{2}}^{k=+\frac{N_C}{2}} (REa_k^n \times \sin(2\pi f_c kt) + IMa_k^n \times \cos(2\pi f_c kt)) \quad [27]$$

$$\frac{dI_{ref}}{dt}(t) = \sum_{k=-\frac{N_C}{2}}^{k=+\frac{N_C}{2}} -2\pi f_c k \times (REa_k^n \times \sin(2\pi f_c kt) + IMa_k^n \times \cos(2\pi f_c kt)) \quad [28]$$

$$\frac{dQ_{ref}}{dt}(t) = \sum_{k=-\frac{N_C}{2}}^{k=+\frac{N_C}{2}} 2\pi f_c k \times (REa_k^n \times \cos(2\pi f_c kt) - IMa_k^n \times \sin(2\pi f_c kt)) \quad [29]$$

$$\frac{dI_{ref}}{dt}(t) - j\frac{dQ_{ref}}{dt}(t) = \quad [30]$$
$$\sum_{k=-\frac{N_C}{2}}^{k=+\frac{N_C}{2}} -2\pi f_c k \times (j \times REa_k^n \times \{-j\sin(2\pi f_c kt) + \cos(2\pi f_c kt)\} +$$
$$IMa_k^n \times \{\cos(2\pi f_c kt) - j\sin(2\pi f_c kt)\})$$

$$\frac{dI_{ref}}{dt}(t) - j\frac{dQ_{ref}}{dt}(t) = \sum_{k=-\frac{N_C}{2}}^{k=+\frac{N_C}{2}} -2\pi f_c k \times (IMa_k^n + jREa_k^n) \times e^{(-j2\pi f_c kt)} \quad [31]$$

$$I_{out}(t) + jQ_{out}(t) = \quad [32]$$
$$I_{ref}(t) + jQ_{ref}(t) + \delta \times \sum_{k=-\frac{N_C}{2}}^{k=+\frac{N_C}{2}} -j2\pi f_c k \times (a_k^n)^* \times e^{(-j2\pi f_c kt)}$$

The sampling error S produces on the sample ($\alpha_k^n$) of carrier index k on the nth OFDM symbol, an image term $(\alpha_{-k}^n)^*$ that is proportional to the k index.

$$(\alpha_k^n)_{out} = (\alpha_k^n) + j2\pi f_c k\delta(\alpha_{-k}^n)^* \quad [33]$$

$$(\alpha_{-k}^n)_{out} = (\alpha_{-k}^n) + j2\pi f_c k\delta(\alpha_k^n)^* \quad [34]$$

The set of equations is applicable for an in-band unitary transfer function loop-back. More generally, the channel response $H_k$, where k is the index of the subcarrier frequency, is defined by the "sins" ADC/DAC sample/hold and analogue filters frequency response in the analogue loop back.

The equations above become with a channel $H_k$:

$$(\alpha_k^n)_{out} = H_k[(\alpha_k^n) + j2\pi f_c k\delta(\alpha_{-k}^n)^*] \quad [35]$$

$$(\alpha_{-k}^n)_{out} = H_{-k}[(\alpha_{-k}^n) - j2\pi f_c k\delta(\alpha_k^n)^*] \quad [36]$$

$H_k$ are computed using dedicated real samples in the frequency domain, which are referred as C symbols denoted $(\alpha_k^C)_{out}$. Considering pilot subcarriers p indexes:

$$(\alpha_p^C)_{out} = H_p[(\alpha_p^C) + j2\pi f_c k\delta(\alpha_{-p}^C)^*] \quad [37]$$

$$(\alpha_{-p}^C)_{out} = H_{-p}[(\alpha_{-p}^C) - j2\pi f_c k\delta(\alpha_p^C)^*] \quad [38]$$

with $(\alpha_{-21}^C) = 1, (\alpha_{-7}^C) = -1, (\alpha_7^C) = 1, (\alpha_{21}^C) = 1$ [39]

Computing for instance the estimation of the sampling error using the equalizer response without loss of generality for the subcarrier −21, it comes:

$$(\alpha_{-21}^C)_{out} = H_{-21}[(\alpha_{-21}^C) + j2\pi f_c(-21)\delta(\alpha_{21}^C)^*] \quad [40]$$

The channel estimate $H_{-21}^{Estim}$ is defined as:

$$H_{-21}^{Estim} = \frac{(a_{-21}^C)_{out}}{(a_{-21}^C)} \quad [41]$$

$$H_{-21}^{Estim} = \frac{H_{-21}[(a_{-21}^C) + j2\pi f_c(-21)\delta(a_{21}^C)^*]}{(a_{-21}^C)} \quad [42]$$

$$H_{-21}^{Estim} = H_{-21}[1 + j2\pi f_c(-21)\delta] \quad [43]$$

The channel estimation is impacted by the sampling error.

Combining the channel estimate from the C symbol to the $n^{th}$ symbol received and equalized, results in equations [44]-[46].

$$(a^n_{-21})_{out\_equalized} = \frac{(a^n_{-21})_{out}}{H^{Estim}_{-21}} = \frac{H_{-21}[(a^n_{-21}) + j2\pi f_c(-21)\delta(a^n_{21})^*]}{H_{-21}[1 + j2\pi f_c(-21)\delta]} \quad [44]$$

$$(a^n_{-21})_{out\_equalized} = \quad [45]$$

$$\frac{(a^n_{-21})_{out}}{H^{Estim}_{-21}} = \frac{[1 + j2\pi f_c(21)\delta]}{[1 + j2\pi f_c(-21)\delta]} \cong [1 + j2\pi fc(21)(2\delta)]$$

$$2\delta = \frac{\text{abs}((a^n_{-21})_{out\_equalized} - 1)}{2\pi f_c(21)} \quad [46]$$

The effect of zero forcing equalization is to provide the sampling error effect twice on the equalized sample as compared to the unitary channel case.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, a baseband integrated circuit for a wireless communication unit may comprise: a modem configured to generate a first and second test digital quadrature signal; a transmitter part, coupled to the modem, and comprising at least one DAC configured to convert the first and second test digital quadrature signals to first and second test analog quadrature signals. A receiver part, comprises at least one ADC configured to receive the first and second test analog quadrature signals via first and second quadrature paths and convert the first and second test analog quadrature signals to first and second received test digital quadrature signal. The baseband integrated circuit further comprises an analog loop back path that connects the transmitter to the receiver. In the baseband integrated circuit, the modem is configured to: estimate a first sampling error performance associated with the first quadrature path from the first received test digital quadrature signal; estimate a second sampling error performance associated with the second quadrature path from the second received test digital quadrature signal; and generate at least one sampling error compensation signal based on the first estimated performance and second estimated performance to be applied to at least one of the receiver and transmitter.

Alternatively, the circuit and/or component examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired sampling error and compensation by operating in accordance with suitable program code, such as minicomputers, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A communication unit comprises:
   a modem configured to generate a first test digital quadrature signal;
   a transmitter coupled to the modem and comprising at least one digital to analog converter, DAC, configured to convert the first test digital quadrature signal to a first test analog quadrature signal;
   a receiver comprising at least one analog to digital converter, ADC, configured to receive the first test analog quadrature signal via a first quadrature path and convert to a first received test digital quadrature signal; and
   an analog loop back path that connects the transmitter to the receiver;
   wherein the transmitter is further configured to generate a second test analog quadrature signal; and the receiver is further configured to receive the second test analog quadrature signal from the transmitter via a second quadrature path and convert to a second received test digital signal;
   wherein the modem is configured to:
      estimate a first sampling error performance associated with the first quadrature path from the first received test digital quadrature signal;
      estimate a second sampling error performance associated with the second quadrature path from the second received test digital quadrature signal; and
      generate at least one sampling error compensation signal based on the first estimated performance and second estimated performance to be applied to at least one of the receiver and transmitter.

2. The communication unit of claim 1 wherein the at least one ADC being configured to estimate a first performance associated with the first quadrature path comprises being configured to estimate a first sampling error performance from at least one of:
   a first signal to noise ratio, SNR, of the first received test digital quadrature signal, and
   a first determination of orthogonal frequency division multiplex, OFDM, pilot phase rotation; and wherein the at least one ADC being configured to estimate a second sampling error performance associated with the second quadrature path comprises being configured to estimate a second performance from at least one of:
   a second signal-to-noise ratio, SNR, of the second received test digital quadrature signal, and
   a second determination of OFDM pilot phase rotation.

3. The communication unit of claim 1 wherein the transmitter comprises at least one transmit analog filter coupled to the at least one DAC such that the first and second test analog quadrature signals are sent through the at least one transmit analog filter and suffer from a first quadrature sampling error and the receiver comprises at least one receive analog filter coupled to the at least one ADC such that the first and second test analog quadrature signals are sent through the at least one receive analog filter and suffer from a second quadrature sampling error.

4. The communication unit of claim 1 wherein the transmitter comprises at least one DAC sample and hold circuit such that the first and second test analog quadrature signals are sent through the at least one DAC sample and hold circuits and suffer from a first quadrature sampling error and the receiver comprises at least one ADC sample and hold circuit such that the first and second test analog quadrature signals are sent through the at least one ADC sample and hold circuits and suffer from a second quadrature sampling error.

5. The communication unit of claim 4 wherein at least one of: the at least one DAC sample and hold circuit, at least one ADC sample and hold circuit, is provided a quadrature clock routed via at least one compensation interpolation filter and the modem provides a compensation signal to the at least one compensation interpolation filter to adjust a delay introduced to the quadrature clock.

6. The communication unit of claim 5, comprising four compensation interpolation filters, wherein each interpolation filter is configured to delay digital IQ samples provided to one of: the quadrature transmit sample and hold circuit, the receive quadrature sample and hold circuit.

7. The communication unit of claim 1 wherein the analog loop back path is a switchable analog loop back path and configurable to route the first test analog quadrature signal from the transmitter to a selectable quadrature path of the receiver.

8. The communication unit of claim 7 wherein the switchable analog loop back path is configurable to route a transmit 'I' quadrature path to either a receive 'I' quadrature path or a receive 'Q' quadrature path, and route a transmit 'Q' quadrature path to either a receive 'Q' quadrature path or a receive 'I' quadrature path.

9. The communication unit of claim 8 wherein the switchable analog loop back path is switchable to route the transmit 'I' quadrature path between the receive 'I' quadrature path and the receive 'Q' quadrature path and switchable to concurrently route the transmit 'Q' quadrature path between the receive 'Q' quadrature path and the receive 'I' quadrature path.

10. The communication unit of claim 1 wherein the modem is further configured to receive the first and second quadrature analog signals via the at least one ADC and estimate the first and second SNR performances digitally in a frequency domain.

11. The communication unit of claim 10 wherein the modem is configured to calculate a first slope of error vector magnitude, EVM, versus frequency corresponding to a sum of the first and second quadrature sampling errors and a second slope of EVM versus frequency corresponding to a difference between the first and second quadrature sampling errors.

12. The communication unit of claim 11 wherein the modem is configured to generate the at least one sampling error compensation signal in response to the sum of the first and second quadrature sampling errors and the difference between the first and second quadrature sampling errors.

13. The communication unit of claim 1 wherein the analog loop back path is a DAC-ADC loop back circuit and used only for test or calibration purposes.

14. The communication unit of claim 2 wherein the OFDM pilot rotation determination comprises a determination of OFDM pilot phase rotation difference over carrier index.

15. An integrated circuit for a wireless communication unit, the circuit comprising:
   a modem configured to generate a test digital quadrature signal;
   a transmitter coupled to the modem and comprising at least one digital to analog converter, DAC, configured to convert the test digital quadrature signal to a first test analog quadrature signal;
   a receiver comprising at least one analog to digital converter, ADC, configured to receive the first test analog quadrature signal via a first quadrature path and convert to a first received test digital quadrature signal; and an analog loop back path that connects the transmitter to the receiver;

wherein the transmitter is further configured to generate a second test analog quadrature signal; and the receiver is further configured to receive the second test analog quadrature signal from the transmitter via a second quadrature path and convert to a second received test digital signal;

wherein the modem is configured to:
- estimate a first sampling error performance associated with the first quadrature path from the first received test digital quadrature signal;
- estimate a second sampling error performance associated with the second quadrature path from the second received test digital quadrature signal; and
- generate at least one sampling error compensation signal based on the first estimated performance and second estimated performance to be applied to at least one of the receiver and transmitter.

16. A method of compensating sampling error in a communication unit, the method comprising:
- generating a test digital quadrature signal; and
- converting by a digital to analog converter, DAC, the test digital quadrature transmit signal to a first test analog quadrature signal;
- receiving the first test analog quadrature signal via a first quadrature path;
- converting by an analog to digital converter, ADC, the first test analog quadrature signal to a first received test digital quadrature signal;
- estimating a first sampling error performance associated with the first quadrature path from the first received test digital quadrature signal;
- generating a second test analog quadrature signal;
- converting by the DAC the second test digital quadrature transmit signal to a second test analog quadrature signal;
- receiving the second test analog quadrature signal via a second quadrature path;
- converting to a second received test digital signal;
- estimating a second sampling error performance associated with the second quadrature path from the second received test digital quadrature signal; and
- generating at least one sampling error compensation signal based on the first estimated performance and second estimated performance to be applied to at least one of a receiver and the transmitter.

17. The method of claim 16 wherein estimating a first performance associated with the first quadrature path comprises estimating a first sampling error performance from at least one of:
- a first signal-to-noise ratio, SNR, of the first received test digital quadrature signal, and
- a first determination of OFDM pilot phase rotation;

and wherein the estimating a second performance associated with the second quadrature path comprises estimating a second sampling error performance from at least one of:
- a second SNR of the second received test digital quadrature signal, and
- a second determination of OFDM pilot phase rotation.

18. The method of claim 16 wherein generating at least one sampling error compensation signal is based on calculating a first slope of error vector magnitude, EVM, versus frequency corresponding to a sum of the first and second quadrature sampling errors; and calculating a second slope of EVM versus frequency corresponding to a difference between the first and second quadrature sampling errors.

19. The method of claim 16 further comprising applying the at least one sampling error compensation signal to at least one of a receiver and the transmitter by providing the compensation signal to at least one compensation interpolation filter to adjust a delay introduced to a quadrature clock applied to the DAC or ADC.

20. The method of claim 16 further comprising switching quadrature paths between a transmitter and a receiver to generate the first quadrature path and second quadrature path.

* * * * *